Oct. 27, 1931.   D. McKAY   1,829,664
CITRUS FRUIT HOLDER
Filed Oct. 4, 1929
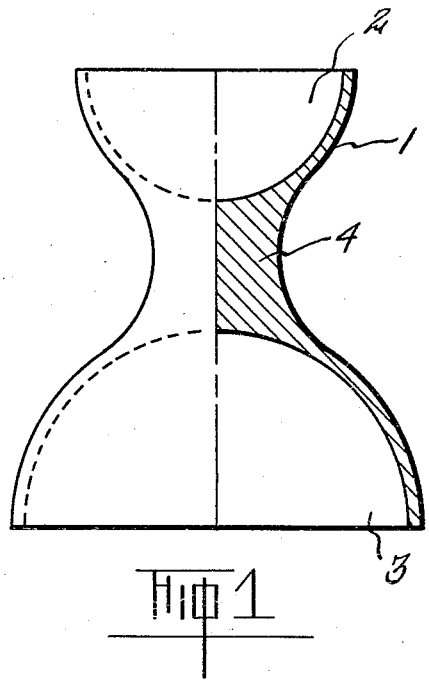
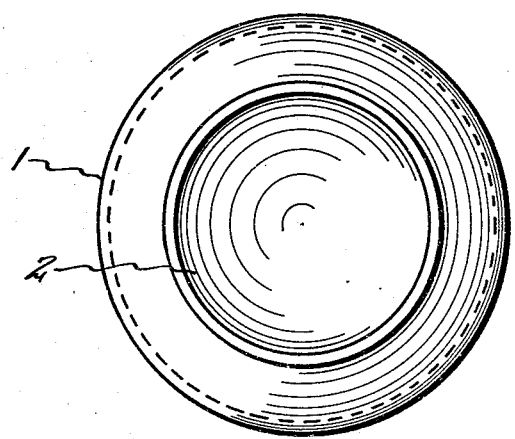
Inventor
*Donald McKay*
By *Carl Miller*
Attorney Patented Oct. 27, 1931

1,829,664

UNITED STATES PATENT OFFICE

DONALD McKAY, OF FLATONIA, TEXAS

CITROUS FRUIT HOLDER

Application filed October 4, 1929. Serial No. 397,270.

This invention relates to a fruit holding device, whereby the method commonly employed for extracting or squeezing the juice therefrom is facilitated, and is more particularly adaptable for use with citrous fruits as for example lemons, oranges or grapefruit.

The object of this invention is to design a holder adapted to receive therein half portions of any one of the various above mentioned fruits, so that the same may be conveniently applied to a juice extractor of the ordinary household variety.

Reference is had to the accompanying drawings wherein:

Figure 1 is an elevational view of the holder shown partly in section, and

Figure 2 is a plan view thereof.

The holder 1 shown in Figure 1 is made of any suitable material as for example metal, glass, wood, porcelain, bakelite, etc., and comprises two substantially cup-shaped portions 2 and 3 integrally united at their bottoms by the neck portion 4. Each of the cup-shaped portions 2 and 3 is substantially semi-spherical in shape and of different sizes. The cup-shaped portion 3 is much larger than the cup-shaped portion 2, so that the holder 1 is adapted to fit varying sizes of fruit. In other words, the upper cup-shaped portion 2 is made of such a size as to snugly receive therein fruits of the size of lemons, limes, etc., while the lower cup-shaped portion 3 is adapted to receive fruits of the size of oranges, grapefruit, etc.

The interior surface of the cup shaped portions may be serrated or roughened so that the same would frictionally engage the skin of the fruit portion to prevent movement thereof relative to the holder.

When the desired half-portion of fruit is placed in the holder the same is inverted and applied over the cone of the ordinary juice extractor. The holder is adapted to be held in the hand which cannot be soiled as the holder is manipulated on the extractor.

While a preferred embodiment of the device has been shown, the same is susceptible of various modifications as to shape, size and material used.

Having thus described my invention, what I claim as new and desire to secure by Letters Patent is:

1. A citrous fruit holder of rigid material, comprising a cup-shaped portion at one end thereof, another cup-shaped portion at the other end thereof, a neck portion integrally united with the bottoms of said cup-shaped portions, said cup-shaped portions being of different diameters whereby to hold a citrous fruit in one of the cup-shaped portions while the juice is being extracted therefrom by pressure on a juice squeezer, the other portion serving as a handle therefor.

2. A fruit holder of rigid material, comprising a cup-shaped portion at one end thereof, another cup-shaped portion at the other end thereof, a neck portion integrally united with the bottom of said cup-shaped portions, said cup shaped portions being of different diameters, the interior surfaces of said cup-shaped portions being roughened or serrated, whereby to hold a citrous fruit in one of the cup-shaped portions while the juice is being extracted therefrom by pressure on a juice squeezer, the other portion serving as a handle therefor.

3. A fruit holder of rigid material comprising a cup-shaped portion at one end thereof, another cup-shaped portion at the other end thereof of substantially different diameter than the first named cup-shaped portion, a neck portion integrally united with the bottoms of said cup-shaped portions, said neck portion being of substantial thickness and strength, and the sides of the cup-shaped portions being of substantial thickness and strength, whereby to hold a citrous fruit in one of the cup-shaped portions while the juice is being extracted therefrom by pressure on a juice squeezer.

In testimony whereof I affix my signature.

DONALD McKAY.